(12) United States Patent
Gremaud

(10) Patent No.: US 12,074,870 B2
(45) Date of Patent: Aug. 27, 2024

(54) DEVICE AUTHENTICATION WITH SEALING AND VERIFICATION

(71) Applicant: NAGRAVISION SÀRL, Cheseaux-sur-Lausanne (CH)

(72) Inventor: Fabien Gremaud, Cheseaux-sur-Lausanne (CH)

(73) Assignee: NAGRAVISION SÀRL, Cheseaux-sur-Lausanne (CH)

( * ) Notice: Subject to any disclaimer, the term of this patent is extended or adjusted under 35 U.S.C. 154(b) by 495 days.

(21) Appl. No.: 17/295,472

(22) PCT Filed: Nov. 22, 2019

(86) PCT No.: PCT/EP2019/082308
§ 371 (c)(1),
(2) Date: May 20, 2021

(87) PCT Pub. No.: WO2020/104685
PCT Pub. Date: May 28, 2020

(65) Prior Publication Data
US 2022/0006808 A1 Jan. 6, 2022

(30) Foreign Application Priority Data

Nov. 23, 2018 (EP) .................................. 18208070

(51) Int. Cl.
*H04L 29/06* (2006.01)
*H04L 9/40* (2022.01)

(52) U.S. Cl.
CPC ........ *H04L 63/0876* (2013.01); *H04L 63/062* (2013.01)

(58) Field of Classification Search
CPC .... H04L 63/0876; H04L 63/062; H04L 63/08
See application file for complete search history.

(56) References Cited

U.S. PATENT DOCUMENTS

| | | | |
|---|---|---|---|
| 9,565,172 B2* | 2/2017 | Ståhl | H04L 9/3247 |
| 10,740,466 B1* | 8/2020 | Bshara | G06F 21/6218 |
| 2017/0048070 A1* | 2/2017 | Gulati | H04L 9/0861 |
| 2018/0009416 A1* | 1/2018 | Maiwand | G07C 9/00896 |
| 2019/0081803 A1 | 3/2019 | Gulati | |

FOREIGN PATENT DOCUMENTS

WO WO-2022106885 A1 * 5/2022

OTHER PUBLICATIONS

Piramuthu, "Lightweight Cryptographic Authentication in Passive RFID-Tagged Systems", IEEE Transactions on Systems, Man, And Cybernetics—Part C: Applications and Reviews, vol. 38, No. 3, May 2008.*
Office Action issued on Apr. 30, 2024, in corresponding Korean Application No. 10-2021-7015587, 5 pages.

* cited by examiner

*Primary Examiner* — Morshed Mehedi
(74) *Attorney, Agent, or Firm* — Maier & Maier, PLLC

(57) ABSTRACT

The disclosure relates to a method for sealing into a device (1) device information, which enable the secure functions of the device (1), managed by a RoT (2) of the device (1) by the security owner, furthermore to bootstrap the device (1) to a system (10) and to finally authenticate the combination of RoT (2) and device information in the device (1). This method has the minimum impact on the device (1) production flow.

14 Claims, 4 Drawing Sheets

DEVICE AUTHENTICATION WITH SEALING AND VERIFICATION

TECHNICAL FIELD

This disclosure generally relates to authenticating device. More specifically, this disclosure relates to Internet of Things (IoT) devices that include a Root-of-Trust (RoT), and that can be authenticated by a system of the security owner.

BACKGROUND ART

An IoT is a network of physical devices, appliances, or items embedded in electronics or software, which enables these objects to exchange data without human interaction. Recommendation ITU-T Y.2060 defines the IoT as a global infrastructure for the information society, enabling advanced services by interconnecting physical and virtual things based on existing and evolving interoperable information and communication technologies. A 'thing' in the terminology 'IoT' is considered an object of the physical world—physical things—or the information world—virtual things—which is capable of being identified and integrated into communication networks. In this definition, physical things exist in the physical world and are capable of being sensed, actuated and connected. Examples of physical things include the surrounding environment, industrial robots, goods and electrical equipment. In this definition, virtual things exist in the information world and are capable of being stored, processed and accessed. Examples of virtual things include multimedia content and application software.

In ITU-T Y.2060, an IoT device is considered a piece of equipment with the mandatory capabilities of communication and the optional capabilities of sensing, actuation, data capture, data storage and/or data processing. IoT devices typically communicate with other devices: they may communicate through the communication network via a gateway, through the communication network without a gateway, or directly without using the communication network. Also, combinations of communication scenarios are possible; for example, devices may communicate with other devices using direct communication through a local network, i.e., a network providing local connectivity between devices and between devices and a gateway, such as an ad-hoc network, and then communication through the communication network via a local network gateway.

The communication networks may transfer data captured by IoT devices to applications and other devices, as well as instructions from applications to devices. The communication networks typically provide capabilities for reliable and efficient data transfer. The IoT network infrastructure may be realized via existing networks, such as conventional TCP/IP-based networks, and/or evolving networks, such as next generation networks (NGN).

IoT devices may be built around an integrated circuit, e.g. in the form of a system on a chip (SoC). Such SoC may include a Root-of-Trust (RoT), which is a set of functions always trusted by the device and provided hardware-based so as to provide strong protection for the credentials and software of devices. A RoT is typically implemented in an integrated Secure Element. It is possible that the RoT is not embedded into the SoC of the device and implemented in the integrated Secure Element of the device. The RoT is in general more trustworthy than a trusted execution environment (TEE).

The RoT can securely share data with other devices on-chip. The RoT provides an environment that is safe for creating, storing and using secrets within the SoC and on behalf of the client applications running on different host CPUs. The RoT can consist of security modules, cryptographic cores, et cetera.

An IoT device can be connected to a particular system requiring a strong authentication of the connected device to, for example, activate certain features. Such authentication typically relies on a unique per device secret embedded in the device which is used in a strong cryptographic authentication protocol setup between the device and the system. A system may for example be an IoT platform.

These unique per device secrets are usually secured in the RoT and are usually provisioned during SoC or Secure Element manufacturing. The systems authenticate the RoT secret embedded in the device. To authenticate the device, the system needs then to securely bound the unique per RoT secret to the device.

Different solutions exist, such as for example the Merlin pairing or the Device Sealing secure message of a TVkey. Merlin pairing makes use of unique keys set at manufacturing. Secure message TVkey makes use of an asymmetric unique key set at chip manufacturing.

A disadvantage of the existing solutions is that they require specific processing during the manufacturing of the device. Using such a conventional technique thus results in longer and more costly manufacturing of the device and has a large impact on the overall production flow of such a device.

SUMMARY

The present disclosure solves the above problems present in the prior art.

According to an aspect of the disclosure, a method is proposed wherein a device can be programmed and authenticated by a system. A memory managed by a Root-Of-Trust RoT of the device can receive device information of the device during device production. The device can be bootstrapped to the system and information can be provided on the RoT and the programmed device information for authenticating the RoT by cryptographic protocols of the system. This can result in a binding between the authenticated RoT and the device information known to the system, and can be used for verifying the device production of the device which can result in the binding being verified by the system.

In this way, specific processing during the manufacturing of the device can be averted. Namely, since the device is programmed and authenticated by the system this saves time during manufacturing.

In an embodiment, the device can have one or multiple SoCs and the RoT can manage the programming of device information for each SoC. Device information may relate to the SoC(s) and also to the device. When relating to the device, the information may for example be on a module, or on the CPU(s), or application(s). As one party can provide the device, and another party can own the device, it is possible to have a module manufacturer and a module/device owner. Thus there is a need to manage the programming of the information for each of them: the module and the owner of the module in which it is embedded, but not necessarily on a different SoC.

In this way, the design of the device is more versatile, and the authenticating can be performed for the different SoCs only using the RoT of the device.

In an embodiment, the RoT does not have to be embedded into any one of the SoCs of the device.

In this way, the design and production of the device becomes more versatile.

In an embodiment, the RoT can agree a dedicated binding key with each of the SoCs of the device during device production, which can be used to cryptographically bound the RoT and the device.

In this way, the RoT and the device can be cryptographically bound to each other. The Key agreement can be a cryptographic challenge that makes use of a Diffie-Hellman key-exchange to have forward secrecy.

In an embodiment, the device key can be used to encrypt the communication between the device and the RoT.

In this way, the device and the RoT can transmit and receive information to each other in a secure manner.

In an embodiment, the programming of device information can be performed in a permanent manner.

In this way, the device information is permanently stored into the device and will not be easily lost.

In an embodiment, the RoT can be configured to bootstrap to the system only once.

In this way, since the bootstrap to the system happens only once, a particular bootstrap creates no conflicts with a previously performed bootstrap. Furthermore, it limits the amount of unwanted communication between the system and the device.

In an embodiment, the method can further consist of reporting information on device production of the RoT to the security owner.

In this way, more information on the device production of a particular RoT placed in a particular device is available to the security owner.

In an embodiment, verification of the device production of the device can include verifying whether the bootstrapped RoT was reported during device production.

In this way, the origin of the device can be more easily checked by the security owner.

In an embodiment, the verification can be forced during the bootstrap of the device to the system.

In this way, the verification of the device information by the system is performed when the system authenticates the device. This results in a better authentication process.

In an embodiment, the verification can be done after the reported information on device production is received by the system.

In this way, the verification process is less dependent on the time the reported information on device production is received by the system. In an embodiment, the bootstrapped information and the reported information on device production can be reported to a security owner of the RoT. In this way, the security owner can determine what device production information corresponds to device bootstrapped information. In other words, the security owner can determine which produced device belongs to which authenticated device.

In an embodiment, the information on the RoT can consist of the public id of the RoT. The minimum information to be reported is the public identifier of the RoT. Other information are optional. Thus when a type of RoT is shared by different device owners with different device production sites: each device owner with different production sites can report the public identifier of the RoT embedded in their device so that one cannot claim the RoT of the other. If a type of RoT is only used by a single device owner, no reports are required for security. Otherwise, the RoT public id report per device owner is mandatory for security.

In this way, the specific RoT that is placed in a particular device can be determined.

According to another aspect of the disclosure, a device is proposed that can comprise a processor configured to perform the steps of the method according to any one of the described embodiments.

According to another aspect of the disclosure, a device is proposed that can comprise an integrated circuit configured to perform the steps of the method according to any one of the described embodiments.

In an embodiment, the device can be an Internet of Things device.

According to another aspect of the disclosure, a computer program product is proposed, which can be implemented on a computer-readable non-transitory storage medium, wherein the computer program product can comprise computer executable instructions which, when executed by a processor, can cause the processor to carry out the steps of the method according to any of the described embodiments.

According to another aspect of the disclosure, a computer-readable non-transitory storage medium is proposed, which can comprise computer executable instructions, and which when executed by a processor can cause the processor to carry out the steps of the method according to any one of the described embodiments.

Hereinafter, embodiments will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Where in the following examples reference is made to a client device, it is to be understood that the disclosure is not limited to application in client devices.

Figure 1:
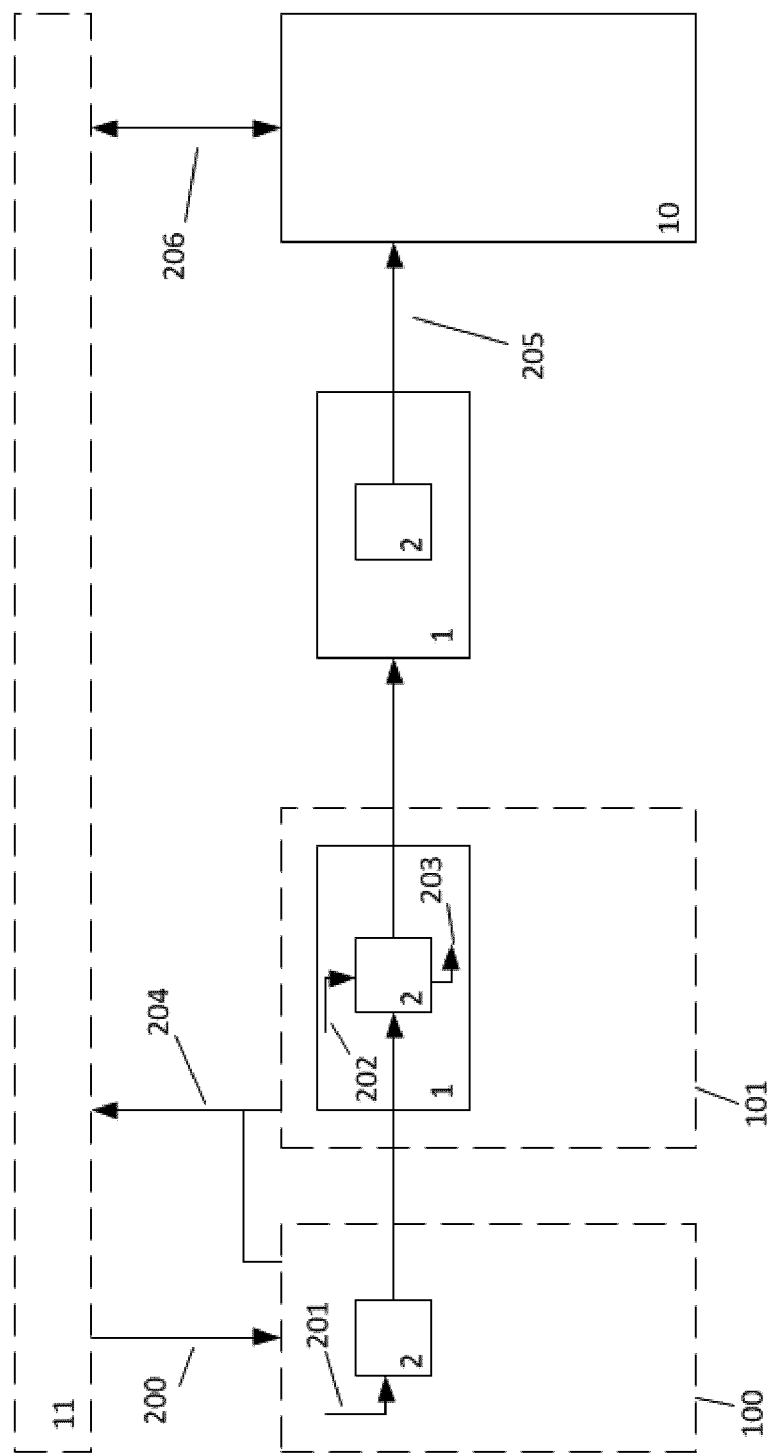
FIG. 1 shows an exemplary embodiment of a production, authentication and verification process of a device.

FIG. 1 shows an exemplary embodiment of a production, authentication and verification process of a device 1.

The security owner 11, during the RoT production 100 may provide 200 the RoT 2 with a RoT public id and a RoT key, which then may be programmed 201 into the RoT 2. The RoT public id is an example of information on the RoT 2 which later may be exchanged with the system 10 that the device 1 will be connecting to. It can be used to identify the specific RoT placed in the device 1. The RoT key may be an example of a cryptographic key that may for example be used to cryptographically bound the RoT 2 and the device 1 or the system 10.

The security owner 11 may provide the information on the RoT 2 to the RoT 2 also during the device production 101. The information on the RoT 2 may be permanently programmed into the RoT 2, or provided to a memory unit managed by the RoT 2.

During the device production 101, device information on the particular device 1 in which the RoT 2 is placed may be sealed 202 into the RoT 2 or a secure memory unit 4 managed by the RoT 2. This secure memory unit 4 may be part of the RoT 2 or be a separate memory unit 4. Sealing may consist of permanently programming the device information into the RoT 2 or the secure memory unit 4 managed by the RoT 2.

The device information on the particular device 1 may include manufacturer information, model information, brand information, version number and serial number, an abstract identifier of the device typically in the form of an Universal Unique Identifier (UUID) but it is not limited to this.

Figure 2:
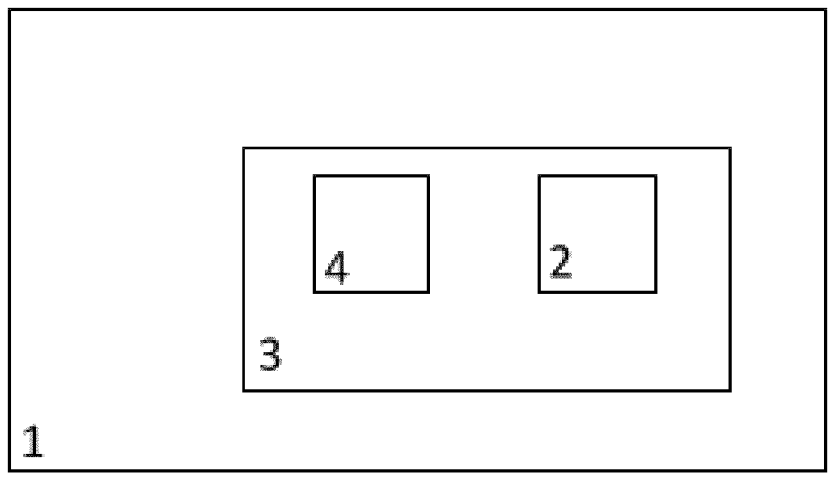
FIG. 2 shows an exemplary embodiment of a device where the RoT is embedded in the SoC.

FIG. 2 shows an exemplary embodiment of a device 1 where the RoT 2 is embedded in the SoC 3. The secure memory unit 4 managed by the RoT 2 in this embodiment is depicted externally to the RoT 2, but it may also be part of the RoT 2.

Figure 3:
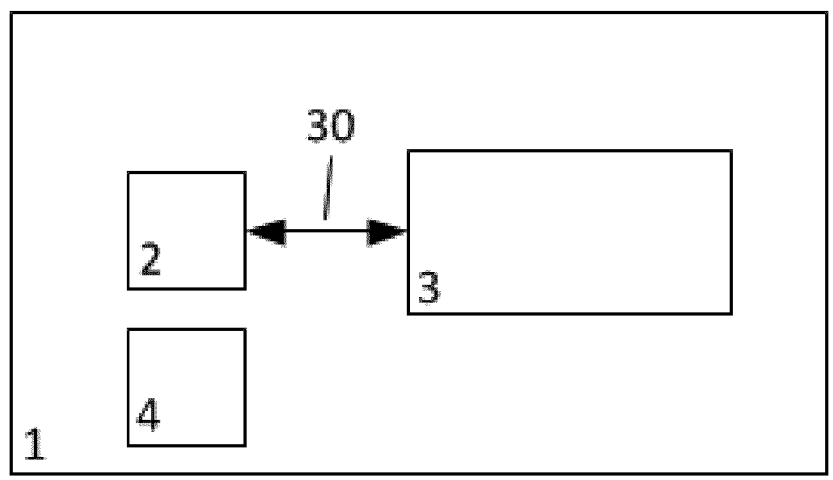
FIG. 3 shows an exemplary embodiment of a device where the RoT is not embedded in the SoC.

FIG. 3 shows an exemplary embodiment of a device 1 where the RoT 2 is not embedded in the SoC 3. The RoT 2 may be part of the device 1, or may be provided externally to the device 1.

In the embodiment of FIG. 3, the communication 30 between the RoT 2 and the SoC 3 may need to be secured, for example by encrypting the communication. To enable this encrypted communication 30, the RoT 2 may agree 203 to use a unique per device key typically using a key agreement cryptographic protocol, for example by mutual authentication, during the sealing procedure, for example only once. This device key is stored in the device 1 and is used to cryptographically bound the RoT 2 and the device 1. Examples of ways in which the communication between the RoT 2 and the device 1 can be encrypted include standard or proprietary public-key based secure channels with mutual authentication between the RoT 2 and the device 1. The mutual authentication may be done at manufacturing and the shared negotiated secret may be programmed in both the memory of the RoT 2 and the memory of the device 1.

Next, the production facility of the devices 1 may report 204 to the security owner 11 a list of information on a RoT 2, for example the RoT public id, used in the device production of a device 1. This information may later be used to verify that a RoT 2 that has been bootstrapped to the system 10 was reported, and thus produced, by the production facility. This information can for example be contained in production logs. Production logs may also contain for example device information together with the RoT public id, or a device serial number together with the RoT public id.

Next, the produced device 1 may be bootstrapped to the system 10. This may be performed just after device production 101, or after the device 1 is sold to a consumer. In this way, bootstrapping and authenticating the device 1 and the RoT 2 of the device 1 may be done separately from the production process 100, 101, thus having a minimum impact on the device production flow.

When the device 1 is bootstrapped to the system 10, it may provide 205 the information on the RoT 2, for example the RoT public id, type or version number, to the system 10 together with the device information sealed during the sealing process 202. The device information may be defined by the device manufacturer, e.g. brand or type. The device information may be a unique identifier defined by the system 10 and returned to the device manufacturer. This transmission of information may be performed in a secured manner, for example using a standard or proprietary secure channel based on a pre-shared secret. For example, a Diffie-Hellman key exchange may be used to set up a secure channel. This will be explained in more detail below.

After the device 1 is for example prompted to initialize the secure link, the device 1 generates a random key pair, consisting of a private part of the key, i.e. private device key, and a public part of the key, i.e. public device key. This is usually a random key pair. The private device key may be a nonce, a number or bit string used only once for cryptography purposes. The public device key may be computed based on the private device key. This is usually done in a more secure part of the device 1.

The device 1 transmits the public device key to the system 10. This transmission may be direct via the secure part of the device 1, or may go via another, less secure part of the device 1. The device 1 may also transmit its unique ID to the system 10. The system 10 may check this unique ID belonging to the device 1 to verify the identity of the device 1 that is trying to establish a secure link with the system 10, and may verify that the unique ID belongs to an actual produced chip. Furthermore, the device 1 may sign the transmission with a signature. This may be used to check authentication, non-repudiation and that the message has not been altered after transmission.

Upon receiving the transmission, the system 10 checks the parameters of the transmission. This means for example checking the signature or the unique ID transmitted by the device 1.

Next, the system 10 generates a key pair, consisting of a private part of the key—private server key—and a public part of the key—public server key. This may be a random key pair. The private server key may be a nonce, and the public server key may be computed based on the private server key.

Next, the system 10 may compute a secure link key, based on the public device key and the private server key. This secure link key may be used to secure the secure link to be formed between the system 10 and the device 1.

The system 10, upon computing the secure link key, transmits the public server key to the device 1. This transmission may be performed via a less secure part of the device 1, or directly to the more secure part of the device 1. The system 10 may also transmit its server certificate, which is used to prove that the public server key sent via the transmission is indeed owned by the system 10. Furthermore, the system 10 may sign the transmission with its signature.

Upon receiving the transmission, the device 1 checks the parameters of the transmission, such as the signature, the server certificate, and computes the secure link key based on the private key of the device 1 and the public key of the system 10. Now, both the device 1 and the system 10 agree on the secure link key. This key may then be used to encrypt and decrypt data transmitted over the secure link between the device 1 and the system 10.

The system 10 may authenticate the RoT 2 using strong cryptographic authentication protocols and secrets. Examples of such protocols and secrets may include TLS or DTLS PKI, a RAW certificate or any PKI scheme with mutual authentication. In this way, the system 10 may verify whether the RoT 2 may be trusted by the system 10. In this manner, the security system may receive the binding between the trusted RoT secret and the device information of the device 1. A RoT 2 may be trusted when the system 10 has authenticated that the data, for example sealing device 1 information and RoT information, received are from a cryptographically authenticated RoT 2. The bootstrap 205 to a system may be performed for example only once by the RoT 2.

Next, the system 10 may verify 206 whether the bootstrapped RoT 2 was reported 204 by the production facility. This verification 206 may be forced during the bootstrap 205 or may be performed after production logs are received by the system 10. In this manner, the system 10 may verify that the RoT 2 that was bootstrapped to the system 10 was in fact produced by the production facility. This verification may be performed by performing specific measurements of the memory of the device to verify that it corresponds to a valid pattern of the bootstrapped type of device. The RoT secret may be used to authenticate the RoT 2. Furthermore, the system 10 may verify that the RoT 2 that was bootstrapped to the system 10 using the device information of the device 1 was in fact placed in that particular device 1. During this verification 206, the RoT public id may be used as the link between the device manufacturing information and for example the RoT secret in order to verify that the RoT 2 was reported by the production facility.

After the verification 206, the RoT 2 and device 1 unique bounding may be reported as authenticated to the database of the system 10.

It may also be that production facility does not report the list of the RoT public id used in the production of the device 2. It may for example be that the security owner of the system 10 already provides the RoT public id to the RoT 2 and thus already knows it. Furthermore, it may be that the RoT public id is reported in the field, for example during the installation of a device 1. The RoT public id may also be reported and verified by remote attestation in the field, for example by checking that a memory footprint matching a device.

The bootstrapped information from bootstrap 205 and the production information 204 may be reported to the RoT security owner 11 to verify the coherence across all the systems 10 using the RoT 2.

The above method thus relies in trusting the device production facility for the sealing 202 of the correct device information and for correctly reporting the production logs 204. This method may hinder a number of possible attacks.

First, an attack called 'legit device upgrade' may be defended against. In this attack, a legit device 1 with a legit RoT 2 may pretend to be another legit device 1. Typically, a low-end device 1 tries to bootstrap 205 as a high-end device 1. As the device information is sealed 202 in the RoT 2 in a trusted environment and securely reported to the system during bootstrap 205, a low-end device 1 cannot pretend to be a high-end device 1 after production.

Secondly, an attack called 'non-legit device' is defended against. In this attack, a non-legit device 1 with a legit RoT 2 may pretend to be a legit device 1. Typically, a non-legit device 1 may bootstrap 205 in a legit system 10 using a valid RoT 2 of the system 10. A non-legit device 1 will be detected during verification step 206 when the system 10 detects that the information on a bootstrapped RoT 2, for example its RoT public id, was not reported 204 by the legit production facility 100,101.

Thirdly, an attack called 'clone device' is defended against. In this attack, a non-legit device 1 may use the RoT 2 of a legit device 1, when the RoT 2 is external to the SoC 3 of the device 1. During the sealing procedure 202, a unique per device key may be installed 203 in the device 1 forcing an attacker to also clone that secret key.

Fourthly, an attack called 'clone RoT' is also defended against. In this attack, a clone RoT 2 tries to bootstrap 205 to the system using the secrets of a legit RoT 2. A clone RoT 2 may be detected during the verification step 206 when a single RoT 2 would attempt multiple bootstraps 205. The system then may refuse the bootstrap 205 and tag the RoT 2 for further investigation. In this way, the security owner can verify the consistency of the RoT 2 by checking that a particular RoT 2 only bootstraps once, to prevent cloning of a particular RoT 2.

Figure 4:
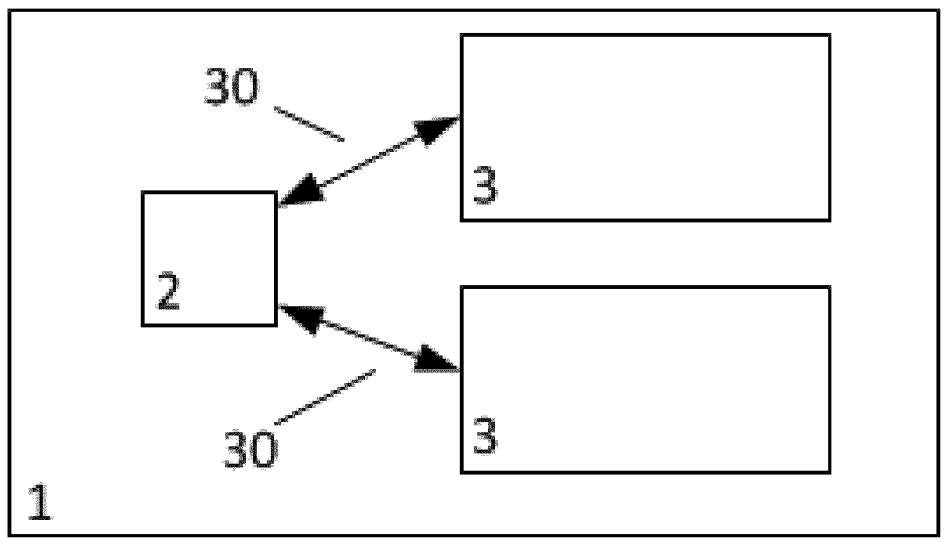
FIG. 4 shows an exemplary embodiment of a device having multiple SoCs.

FIG. 4 shows an exemplary embodiment of a device 1 having multiple SoCs 3.

In this embodiment, the RoT 2 of the device 1 may manage multiple sealing procedures with one or multiple production facilities. The above described method thus also supports multiple SoCs 3 per device 1.

Figure 5:
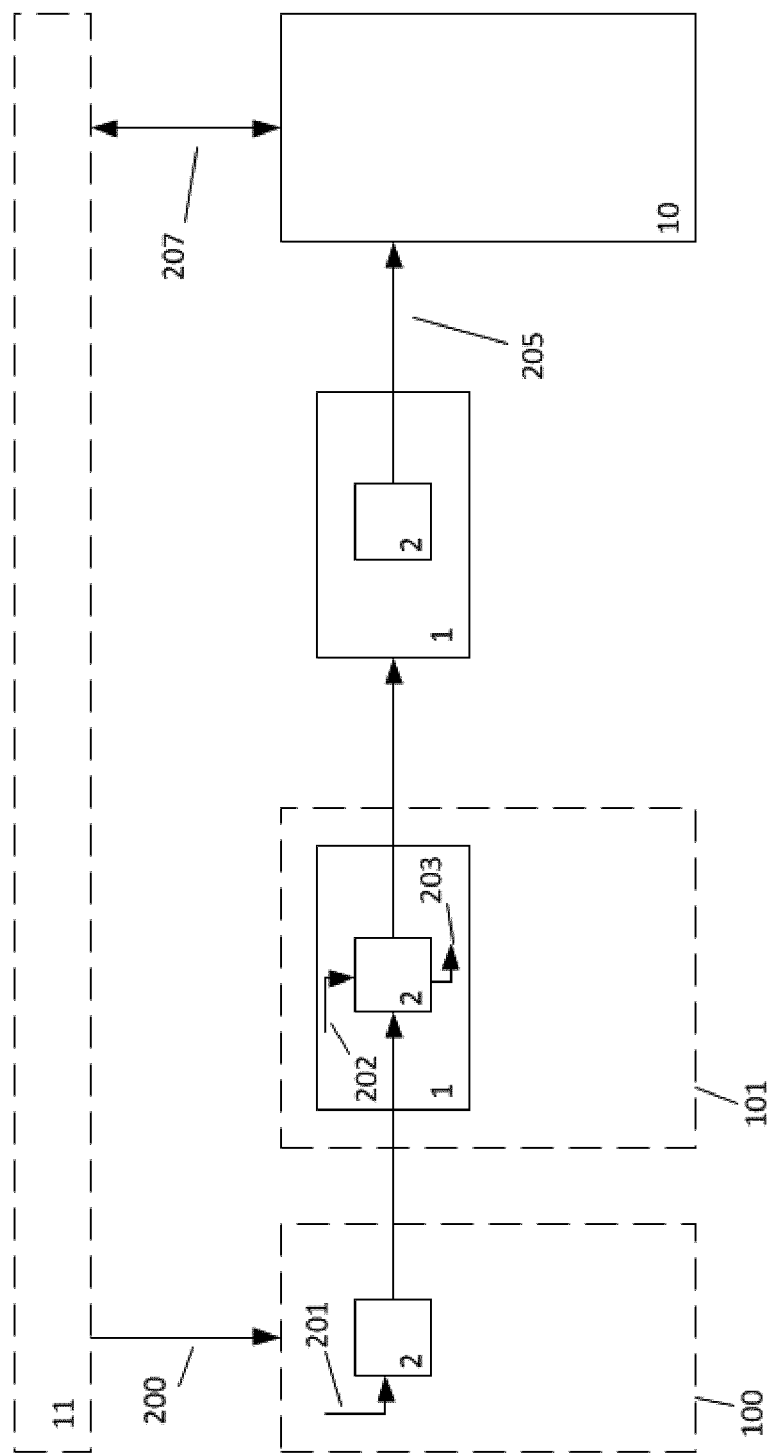
FIG. 5 shows an exemplary embodiment of a production, authentication and verification process of a device where no production information is sent to the security owner by device production.

FIG. 5 shows an exemplary embodiment of a production, authentication and verification process of a device 1 where no production information is sent to the security owner by device production.

One advantage of the system 10 is that the system 10 remains functional and partially secure even when the production information is partial or missing. A post-verification process 207 may be performed to authenticate the non-fully authenticated devices 1. This is especially useful for a system 10 managing a large number of devices 1. Such a post-verification process 207 may include for example a secure remote measurement of a device memory region, performed by the RoT 2. This is especially efficient when the RoT 2 is integrated in a SoC 3.

One or more embodiments may be implemented as a computer program product for use with a computer system. The program(s) of the program product may define functions of the embodiments, including the methods described herein, and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

Two or more of the above embodiments may be combined in an appropriate manner.

The invention claimed is:

1. A method of authenticating a device by a system, the method comprising:
   receiving device information of a device into a memory managed by a Root-of-Trust (ROT) of the device during device production,
   sealing the device information into the RoT or into the memory managed by the RoT,
   bootstrapping the device to the system by
   providing to the system information on the ROT and the device information for authenticating the RoT by cryptographic protocols of the system resulting in a binding between the ROT and the device information known to the system, and for verifying the device information, wherein the binding between the ROT and the device information is verified by the system.

2. The method according to claim 1, wherein the device has one or multiple SoCs and the ROT manages the programming of device information for each of the one or multiple SoCs.

3. The method according to claim 2, wherein the RoT is not embedded into any one of the one or multiple SoCs of the device.

4. The method according to claim 3, wherein the ROT agrees on a dedicated binding key with each SoCs of the device during device production that is used to cryptographically bind the ROT and the device.

5. The method according to claim 4, characterized in that the dedicated binding key is used to encrypt the communication between the device and the ROT.

6. The method according to claim 1, wherein the RoT is configured to bootstrap to the system only once.

7. The method according to claim 1, further comprising reporting information on device production of the ROT to a security owner.

8. The method according to claim 7, wherein verification of the device production of the device includes verifying whether the bootstrapped ROT was reported during device production.

9. The method according to claim 7, wherein the verification is forced during the bootstrap of the device to the system.

10. The method according to claim 7, wherein the bootstrapped information and the reported information on device production is reported to a security owner of the RoT.

11. The method according to claim 1, wherein the information on the RoT consists of the public id of the RoT.

12. A device comprising:
    a Root-of-Trust, ROT, providing an environment safe for storing secrets, the RoT configured to securely share data;
    a memory managed by the RoT, the memory being configured to store device information received during production of the device; and
    a processor configured to
    provide RoT information to the system; and
    provide the device information stored in the memory to the system for authenticating the RoT by cryptographic protocols of the system resulting in a binding between the ROT and the device information, and for verifying the device information, wherein the binding between the ROT and the device information is verified by the system.

13. A device comprising an integrated circuit, wherein the integrated circuit is configured to perform the steps of the method according to claim 1.

14. A computer program product, implemented on a computer-readable non-transitory storage medium, wherein the computer program product comprises computer executable instructions which, when executed by a processor, cause the processor to carry out the steps of the method according to claim 1.

* * * * *